Dec. 31, 1935.  R. I. BODENLOS  2,026,017
ADJUSTABLE PISTON RING
Filed Sept. 27, 1934
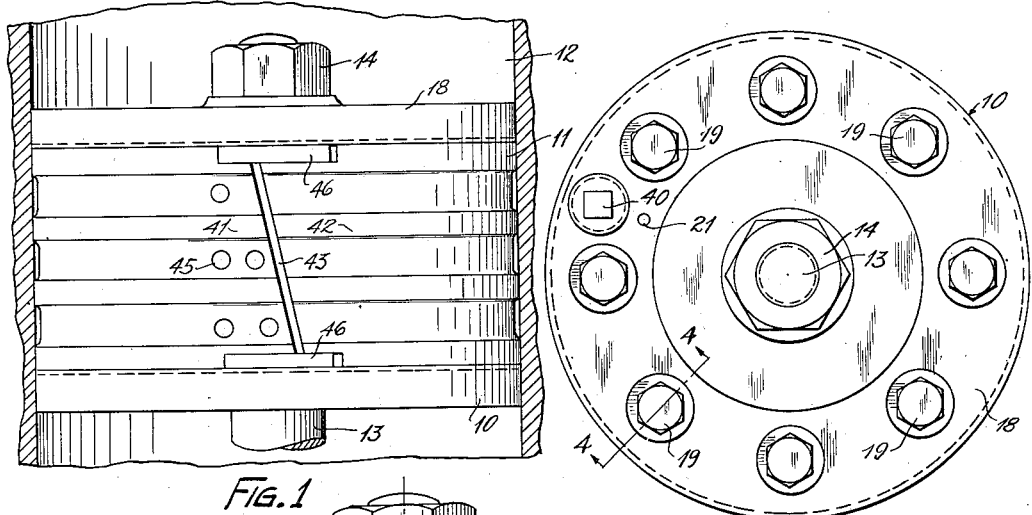
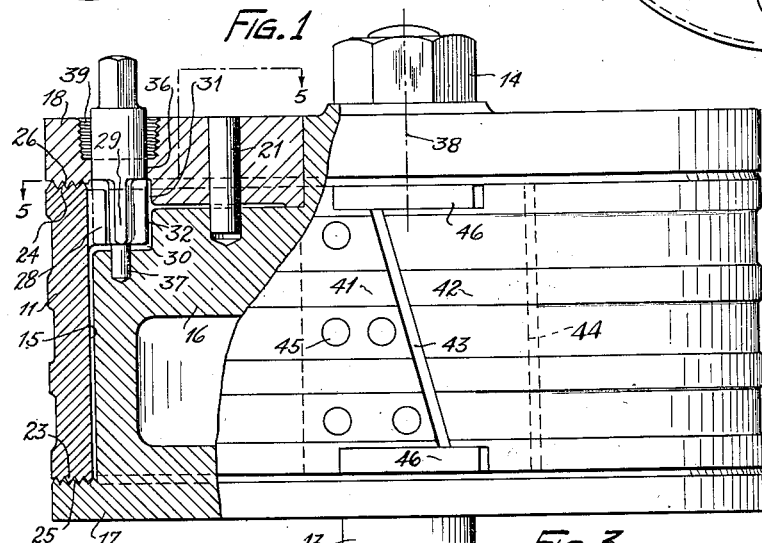
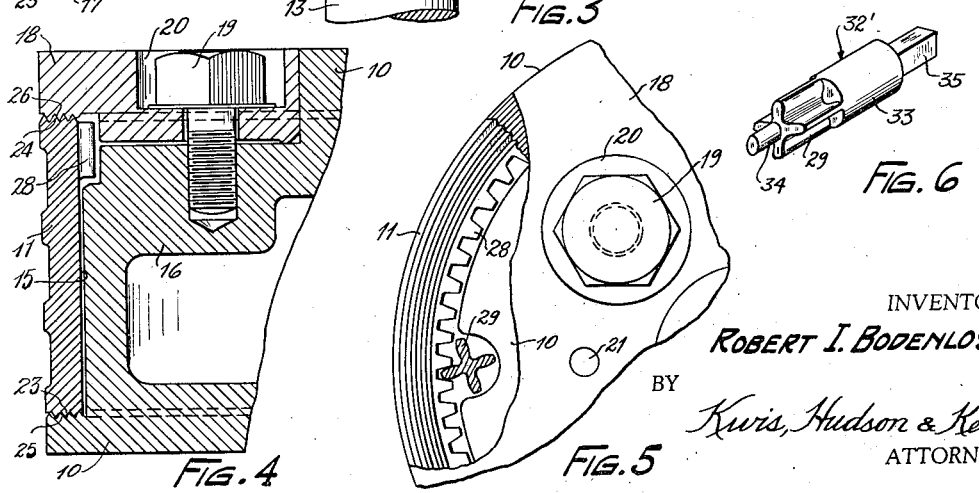
INVENTOR.
ROBERT I. BODENLOS
BY
Kwis, Hudson & Kent
ATTORNEYS Patented Dec. 31, 1935

2,026,017

UNITED STATES PATENT OFFICE 2,026,017

ADJUSTABLE PISTON RING

Robert I. Bodenlos, Cleveland, Ohio, assignor to The American Ship Building Company, Cleveland, Ohio, a corporation of New Jersey Application September 27, 1934, Serial No. 745,772

18 Claims. (Cl. 309—35)

This invention relates to piston rings, and as its principal object, aims to provide an improved form of adjustable piston ring.

Another object of the invention is to provide an improved piston ring having novel adjusting means whereby the ring can be adjusted accurately and with facility to a desired diameter and will be retained at the desired adjustment and at all times properly centered with respect to the axis of the piston.

Still another object of the invention is to provide an improved sealing ring arrangement for a piston, wherein the piston and ring are provided with cooperating means effective for varying the ring diameter upon relative rotary movement between the ring and piston.

A further object of the invention is to provide an improved sealing ring arrangement of the type referred to, wherein novel means is provided for causing the relative rotary movement between the ring and piston.

Still another object of the invention is to provide a sealing ring arrangement for a piston, wherein the ring groove of the piston is provided at the sides thereof with right and left hand spiral threads, and the sealing ring is provided at the corresponding sides thereof with left and right hand spiral threads which engage the threads of the ring groove.

It is also an object of this invention to provide a novel form of piston ring having spiral threads of opposite hand on its opposite side faces.

Other objects and advantages of the invention will be apparent from the following description and accompanying drawing, wherein Fig. 1 is an elevational view with parts broken away showing a piston to which my improved sealing means has been applied.

Fig. 2 is a top plan view of the piston.

Fig. 3 is an elevational view of the piston with parts in section, illustrating the construction and arrangement of my improved sealing ring and the adjusting means therefor.

Fig. 4 is a partial sectional view further illustrating the sealing ring construction and arrangement, taken on line 4—4 of Fig. 2.

Fig. 5 is a partial plan view of the piston with parts broken away to show the piston ring adjusting means, and Fig. 6 is a detached perspective view showing the ring adjusting pinion.

In the accompanying drawing, to which detailed reference will now be made, I have shown what I now regard to be a preferred form of my improved piston ring and the adjusting means therefor.

In Figs. 1 and 2 of the drawing I have shown a piston 10 to which my improved sealing ring 11 has been applied. The piston is shown as being arranged for operation in a cylinder 12 and is suitably mounted on a piston rod 13 and retained thereon by means of the nut 14. The sealing ring 11 is disposed in an annular groove 15 which is provided on the piston and cooperates with the cylinder wall and the sides of the ring groove to perform the usual function of a piston ring, namely, that of preventing leakage of fluid past the piston.

The sealing ring of my invention may be applied to various types of pistons, for example, it may be used on power pistons, valve pistons, pump pistons or the like. The piston 10 which is shown in this instance may be any one of such pistons, and may be constructed with the body 16 thereof formed of cast metal or any other suitable material. The piston body may be provided at one end thereof with an annular flange part 17 which forms one side wall of the piston ring groove 15. The other side wall of the ring groove may be formed by an annular follower plate 18 which is removably secured to the body of the piston by an annular series of bolts 19. The bolts may extend through the follower plate and into the piston body, as shown in Fig. 4, with the heads of the bolts disposed in countersunk openings 20 of the follower. If desired, one or more dowel pins 21 may be provided for properly locating the follower on the piston.

According to the principal feature of my invention I provide cooperating means on the ring and piston which is effective for varying the diameter of the ring. This means may comprise a spiral thread formed on a side face of the piston ring, and a spiral thread of similar pitch, but opposite hand, on the adjacent side face or wall of the piston ring groove and which is engaged by the spiral thread of the ring. These cooperating threads are preferably provided at both sides of the piston ring and groove or, in other words, at both the top and bottom of the ring as shown in Figs. 3 and 4 of the drawing.

In the drawing I have represented at 23 and 24 the spiral threads which are provided on the opposite side faces of the ring 11. These threads are of the same pitch but are of opposite hand, that is to say, the thread 23 is a left hand thread while the thread 24 is a right hand thread. The thread 23 of the piston ring cooperates with a thread 25 formed on the flange part 17 of the piston, and the thread 24 of the ring cooperates with a thread 26 provided on the follower plate 18. The thread 25 of the piston is a right hand thread and the thread 26 is a left hand thread or, in other words, the threads 25 and 26 are of opposite hand, respectively, from the threads 23 and 24. It will be understood that the spiral threads 23 and 24 of the ring and the spiral threads 25 and 26 of the piston extend continuously for substantially the full circumference of the ring and groove, and that the centers for the threads of the piston are on the longitudinal axis of the piston.

With the arrangement of threads just described it will be seen that when the ring and piston are rotated relatively the ring will be expanded or contracted, depending upon the direction of relative rotation, and such expansion or contraction will be in direct proportion to the angular distance through which the relative rotation takes place. For example, if the threads are formed with a one-eighth inch pitch or lead, one complete revolution of the ring will cause the same to be expanded or contracted one-eighth of an inch in diameter. It will, therefore, be seen that by simply rotating the ring relative to the piston the ring can be expanded or contracted as desired, and by rotating the ring through a given angular distance the ring can be adjusted very accurately to a desired cylinder diameter. If desired, such adjustment can be made while the cylinder and piston are at their normal operating temperature, and by reason of the adjusting means which I have provided a more accurate and efficient co-operation between the piston and cylinder can be obtained than has heretofore been possible.

The adjusting of the ring can be accomplished in various ways, for example, the bolts of the follower plate can be loosened and the piston can be extended part way out of the cylinder to afford access to the ring so that the latter can be rotated on the piston. If desired, the adjustment of the ring might also be made by first removing the follower plate entirely and then shifting the ring through the desired angular distance and then replacing the follower plate on the piston.

As another feature of my invention, I have provided a very useful means by which the piston ring can be adjusted with greater facility. As best shown in Figs. 3 and 5 of the drawing, this adjusting means comprises a rack or internal ring gear 28 which is formed on the inner face or back of the piston ring 11, and a pinion 29 which cooperates with this rack to cause the ring to be rotated on the piston. Annular recesses 30 and 31 may be provided on the piston body and the follower plate so as to register with each other when the follower plate is mounted on the piston and thus provide an annular groove or space 32 to accommodate the gear 28 of the piston ring.

As shown in the drawing, the adjusting pinion 29 may be constructed as a part of a tool 32' which can be removably applied to the gear 28 of the piston ring. To this end I construct the tool with a journal part 33 which is preferably of the same or larger diameter than the outside diameter of the pinion 29 and with a journal portion 34 of reduced diameter on the opposite side of the pinion. Outwardly of the journal portion 33, the tool may be provided with a squared part 35 to which a suitable wrench or handle may be applied for rotating the pinion.

The follower plate 18 and the piston body are provided with aligned openings 36 and 37 which communicate with the annular groove 32 and are located at a radial distance from the axis 38 of the piston, such that when the adjusting tool 32' is inserted into the opening 36, the teeth of the pinion 29 will properly mesh with the teeth of the ring gear 28. When the tool is in operative position for adjusting the piston ring, as shown in Fig. 3, the journal portions 33 and 34 of the tool are received, respectively, in the openings 36 and 37 which serve as bearings for rotatably supporting the tool in proper position. Rotation of the tool when in the position shown in Fig. 3, and with the follower plate bolts loosened, will cause the piston ring 11 to be rotated on the piston, and the cooperating threads of the ring and piston groove will expand or contract the ring to produce the desired adjustment.

After the ring has been expanded or contracted to the diameter desired, the follower plate is tightened down by means of the bolts 19 so as to clamp the ring between the follower plate and the flange 17 of the piston body. The clamping action exerted on the ring by the follower plate prevents accidental shifting of the ring which would change its diameter. The cooperating threads on the piston and ring maintain the latter at all times in centered relation with respect to the axis 38 of the piston. In other words, the cooperating threads prevent lateral shifting of the ring in the groove, and regardless of the extent to which the diameter of the ring is varied by the adjusting means, the ring will always be concentric with the piston.

The follower plate 18 may also be provided with a threaded opening 39 outwardly of the bearing opening 36, and after the desired adjustment of the piston ring has been made and the adjusting tool 32' has been withdrawn, this opening may be closed by a screw plug 40 which may be screwed into the threaded opening.

The ring 11 is shown in this instance as having the ends 41 and 42 thereof arranged to form a diagonal joint 43, but any other suitable form of ring joint may be provided. The ring is also shown as being provided with a gap piece 44 which is secured to the ring end 41 by the rivets 45 and which overlaps the joint 43. The gap piece may be countersunk into the rear face of the piston ring and may have flange portions 46 countersunk into the side faces of the ring.

From the foregoing description and the accompanying drawing it should now be readily understood that I have provided an improved form of piston ring arrangement, wherein the ring can be easily and quickly adjusted to an accurate diameter size required for efficient operation of the piston in a cylinder. It will be seen further that this adjusting of the piston ring is obtained by providing cooperating spiral threads on the ring and piston which are effective for varying the ring diameter upon relative rotation between the ring and piston. In addition to expanding or contracting the ring to the desired diameter, the cooperating spiral threads also serve to always maintain the ring in concentric relation to the piston.

Having thus described my invention I claim:

1. In combination, a piston, and a metal sealing ring thereon, said piston and ring having cooperating spiral threads formed thereon for varying the diameter of the ring upon relative rotary movement between the ring and piston.

2. In combination, a piston, a metal sealing ring, and cooperating spiral threads on the piston and ring for centering the ring on the piston, said threads being effective for varying the diameter of the ring upon relative rotary movement between the ring and piston and to distribute ring expansion or contraction substantially uniformly therearound whereby the circular shape of the ring is maintained.

3. In combination, a piston, a ring, and cooperating spiral means on the piston and ring effective for varying the ring diameter upon relative rotary movement between the ring and piston.

4. In combination, a piston, and a sealing ring therefor, said piston and ring having cooperating spiral threads thereon lying substantially in a transverse plane of the piston.

5. In combination, a piston, a sealing ring therefor, and means providing a connection whereby the ring may be adjusted on the piston by relative rotary movement, said connection comprising cooperating spiral threads on the ring and piston lying substantially in a transverse plane of the piston.

6. In combination, a piston, a sealing ring therefor, a right and left hand spiral thread connection between the piston and ring arranged to retain the latter in a desired circular condition of expansion, and means for pressing the spiral threads into interfitting relation.

7. In combination, a piston, a sealing ring therefor, a spiral ridge and groove connection between the piston and ring for expanding the latter to a given diameter, and means pressing the ridge and groove into interfitting relation for retaining the ring in the desired adjustment.

8. In combination, a piston having thereon a spiral thread which has the same axis as the piston itself, a sealing ring for the piston having a spiral thread cooperating with the piston thread, and means for retaining the thread of the ring in interfitting engagement with the thread of the piston whereby the ring is centered with respect to the piston axis and held in a desired expanded condition.

9. In combination, a piston having an annular recess thereon, and a sealing ring in said recess, said recess having a thread on a side wall thereof and said ring having on a side face thereof a thread of opposite hand for cooperation with the thread of the recess.

10. In combination, a piston having an annular recess thereon, a thread on a side wall of said recess, a sealing ring having thereon a thread of opposite hand engaging the thread of said recess, and means for retaining said threads in engagement with each other.

11. In combination, a piston having an annular recess thereon, a thread on a side wall of said recess, a sealing ring having thereon a thread of opposite hand engaging the thread of said recess, a follower adjustably connected with the piston and forming the opposite side wall of the recess, and cooperating right and left hand threads on said follower and the adjacent side face of the ring.

12. A piston ring having a spiral thread on a side face thereof.

13. A piston ring having spiral threads of opposite hand on its opposite side faces.

14. A piston ring having generally flat substantially parallel side faces lying in planes disposed substantially normal to the axis of the ring and spiral threads on said side faces, the thread on one side face being of opposite hand from the thread on the opposite side face.

15. A piston ring having a spiral thread on a side face thereof and gear teeth on the inner face thereof.

16. In combination a piston, a sealing ring therefor, cooperating means on the piston and ring effective for varying the ring diameter upon rotation of the ring relative to the piston comprising spiral threads formed on the piston and ring, and means for causing such relative rotation.

17. In combination a piston, a sealing ring therefor, cooperating means on the piston and ring effective for varying the ring diameter upon rotation of the ring relative to the piston comprising spiral threads formed on the piston and ring, and means for causing such relative rotation comprising gear teeth on said ring and a gear member cooperating with said teeth.

18. In combination a piston, a sealing ring therefor, cooperating means on the piston and ring effective for varying the ring diameter upon rotation of the ring relative to the piston comprising spiral threads formed on the piston and ring, said ring having gear teeth thereon and said piston having an opening affording access to said teeth, and a gear member removably arranged in said opening for cooperation with said teeth.

ROBERT I. BODENLOS.